(12) United States Patent
Cheng et al.

(10) Patent No.: US 9,110,453 B2
(45) Date of Patent: Aug. 18, 2015

(54) MODEL-FREE ADAPTIVE CONTROL OF ADVANCED POWER PLANTS

(75) Inventors: George Shu-Xing Cheng, Folsom, CA (US); Steven L. Mulkey, Cameron Park, CA (US); Qiang Wang, Sacramento, CA (US)

(73) Assignee: General Cybernation Group Inc., Rancho Cordova, CA (US)

( * ) Notice: Subject to any disclaimer, the term of this patent is extended or adjusted under 35 U.S.C. 154(b) by 562 days.

(21) Appl. No.: 13/441,610

(22) Filed: Apr. 6, 2012

(65) Prior Publication Data

US 2012/0259437 A1    Oct. 11, 2012

Related U.S. Application Data

(60) Provisional application No. 61/473,308, filed on Apr. 8, 2011.

(51) Int. Cl.
| | |
|---|---|
| G05B 13/02 | (2006.01) |
| G06F 15/18 | (2006.01) |
| G06E 3/00 | (2006.01) |
| G05B 13/04 | (2006.01) |

(52) U.S. Cl.
CPC ............ *G05B 13/027* (2013.01); *G05B 13/024* (2013.01); *G05B 13/0265* (2013.01); *G05B 13/042* (2013.01)

(58) Field of Classification Search
CPC ............... G05B 13/042; G05B 13/024; G05B 13/0265; G05B 13/027; G05B 13/048; G05B 13/0285; G06N 3/004; G06N 3/063; G06N 3/08

USPC ................. 700/45, 44, 47; 706/23, 14, 15, 16
See application file for complete search history.

(56) References Cited

U.S. PATENT DOCUMENTS

| | | | | |
|---|---|---|---|---|
| 5,159,660 | A | * | 10/1992 | Lu et al. ........................... 706/23 |
| 5,335,643 | A | * | 8/1994 | Abate et al. .................... 123/679 |
| 5,367,612 | A | * | 11/1994 | Bozich et al. .................... 706/23 |
| 5,486,996 | A | * | 1/1996 | Samad et al. .................... 700/32 |
| 5,498,943 | A | * | 3/1996 | Kimoto et al. ................ 318/601 |
| 5,513,098 | A | * | 4/1996 | Spall et al. ....................... 700/38 |
| 5,517,418 | A | * | 5/1996 | Green et al. .................... 701/13 |
| 5,642,722 | A | * | 7/1997 | Schumacher et al. ........ 123/673 |

(Continued)

OTHER PUBLICATIONS

F. Davelaar, D. Faille, "Dynamic Modeling of a Once-through 600 MWe Subcritical CFB Boiler for Flexibility Optimization at Basic Design Stage," Electricité de France, R&D, 6 Quai Watier, 78400 Chatou, France, Jan. 2004.

(Continued)

*Primary Examiner* — Kenneth M Lo
*Assistant Examiner* — Jason Lin
(74) *Attorney, Agent, or Firm* — DLA Piper LLP (US)

(57) ABSTRACT

A novel 3-Input-3-Output (3×3) Model-Free Adaptive (MFA) controller with a set of artificial neural networks as part of the controller is introduced. A 3×3 MFA control system using the inventive 3×3 MFA controller is described to control key process variables including Power, Steam Throttle Pressure, and Steam Temperature of boiler-turbine-generator (BTG) units in conventional and advanced power plants. Those advanced power plants may comprise Once-Through Supercritical (OTSC) Boilers, Circulating Fluidized-Bed (CFB) Boilers, and Once-Through Supercritical Circulating Fluidized-Bed (OTSC CFB) Boilers.

9 Claims, 9 Drawing Sheets

(56) References Cited

U.S. PATENT DOCUMENTS

| | | | |
|---|---|---|---|
| 5,740,324 A * | 4/1998 | Mathur et al. | 706/16 |
| 5,781,700 A * | 7/1998 | Puskorius et al. | 706/14 |
| 5,992,383 A * | 11/1999 | Scholten et al. | 123/399 |
| 6,055,524 A * | 4/2000 | Cheng | 706/23 |
| 6,360,131 B1 | 3/2002 | Cheng | |
| 6,556,980 B1 * | 4/2003 | Cheng | 706/23 |
| 6,684,112 B1 | 1/2004 | Cheng | |
| 6,684,115 B1 * | 1/2004 | Cheng | 700/45 |
| 7,016,743 B1 | 3/2006 | Cheng | |
| 7,142,626 B2 * | 11/2006 | Cheng | 377/70 |
| 7,152,052 B2 * | 12/2006 | Cheng | 706/23 |
| 7,415,446 B2 * | 8/2008 | Cheng et al. | 706/23 |
| 8,239,339 B2 * | 8/2012 | Weber et al. | 706/47 |
| 8,260,733 B2 * | 9/2012 | Sullivan et al. | 706/21 |
| 8,489,535 B2 * | 7/2013 | Weber et al. | 706/46 |
| 2009/0012653 A1 * | 1/2009 | Cheng et al. | 700/287 |
| 2012/0040298 A1 * | 2/2012 | Beveridge et al. | 432/13 |

OTHER PUBLICATIONS

Goidich, S. J., Fan, Z., Sippu, O., Bose, A.C., "Integration of Ultra-Supercritical OTU and CFB Boiler Technologies," Foster Wheeler and National Energy Technology Laboratory, Jun. 2003.

* cited by examiner

MODEL-FREE ADAPTIVE CONTROL OF ADVANCED POWER PLANTS

This application claims priority to U.S. Provisional Application No. 61/473,308 filed on Apr. 8, 2011, which is herein incorporated by reference.

This invention was made with government support under SBIR grant DE-FG02-06ER84599 awarded by the U.S. Department of Energy. The government has certain rights to the invention.

INVENTION

The subject of this patent relates to automatic control of power plants, and more particularly to a method and apparatus for intelligently controlling the boiler-turbine-generator (BTG) units of power plants.

For the U.S. to reach its future energy objectives, visions to build ultra-clean and highly efficient energy plants of the future have to be realized. In parallel with the development of sensors, more robust and flexible process control technologies must be developed to build an intelligent control system that can yield a fully automated operation and be adaptive to changing process needs and fuel availability. It must be safe, reliable, and easy to install, maintain, and operate. The intelligent control system is aimed to control conventional boilers as well as advanced boilers including Once-through Supercritical Boilers, Circulating Fluidized-bed (CFB) Boilers, and Supercritical CFB Boilers in future energy plants that can deliver maximum-energy-efficiency, near-zero-emissions, fuel-flexibility, and multi-products.

First introduced in 1997, the Model-Free Adaptive (MFA) control technology overcomes the shortcomings of traditional Proportional-Integral-Derivative (PID) controllers and is able to control various complex processes that may have one or more of the following behaviors: (1) nonlinear, (2) time-varying, (3) large time delay, (4) multi-input-multi-output, (5) frequent dynamic changes, (6) open-loop oscillating, (7) pH process, and (8) processes with large load changes and disturbances.

Since MFA is "Model-Free", it also overcomes the shortcomings of model-based advanced control methods. MFA is an adaptive and robust control technology but it does not require (1) precise process models, (2) process identification, (3) controller design, and (4) complicated manual tuning of controller parameters. A series of U.S. patents and related international patents for Model-Free Adaptive (MFA) control and optimization technologies have been issued. Some of them are listed in Table 1.

TABLE 1

| U.S. Pat. No. | Patent Name |
| --- | --- |
| 6,055,524 | Model-Free Adaptive Process Control |
| 6,556,980 | Model-Free Adaptive Control for Industrial Processes |
| 6,360,131 | Model-Free Adaptive Control for Flexible Production Systems |
| 6,684,115 | Model-Free Adaptive Control of Quality Variables (1) |
| 6,684,112 | Robust Model-Free Adaptive Control |
| 7,016,743 | Model-Free Adaptive Control of Quality Variables (2) |
| 7,142,626 | Apparatus and Method of Controlling Multi-Input-Single-Output Systems |
| 7,152,052 | Apparatus and Method of Controlling Single-Input-Multi-Output Systems |
| 7,415,446 | Model-Free Adaptive Optimization |

Commercial hardware and software products with Model-Free Adaptive control have been successfully installed in most industries and deployed on a large scale for process control, building control, and equipment control.

In this patent, we introduce a novel 3-Input-3-Output (3×3) Model-Free Adaptive (MFA) controller, which enhances the capabilities of the MIMO MFA controllers described in U.S. Pat. Nos. 6,055,524 and 6,556,980. We will also describe a 3×3 MFA control system using the inventive 3×3 MFA controller to control key process variables including Power, Steam Throttle Pressure, and Steam Temperature of boiler-turbine-generator (BTG) units in conventional and advanced power plants.

In this patent, the term "mechanism" is used to represent hardware, software, or any combination thereof The term "process" is used to represent a physical system or process with inputs and outputs that have dynamic relationships.

Without losing generality, all numerical values given in controller parameters in this patent are examples. Other values can be used without departing from the spirit or scope of our invention.

DESCRIPTION

A. Single-Variable MFA Control System

Figure 1:
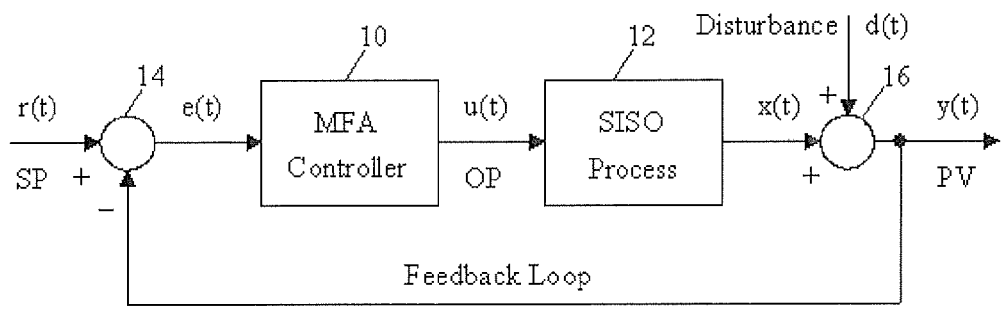
FIG. 1 is a block diagram illustrating a single variable Model-Free Adaptive (MFA) control system.

FIG. 1 illustrates a single variable Model-Free Adaptive (MFA) control system as described in the U.S. Pat. No. 6,556,980 B1 comprising a single-input-single-output (SISO) MFA controller 10, a SISO process 12, and signal adders, 14, 16. The signals shown in FIG. 1 are as follows:

r(t)—Setpoint (SP)
y(t)—Measured Process Variable (PV), y(t)=x(t)+d(t).
x(t)—Process Output
u(t)—Controller Output (OP)
d(t)—Disturbance, the disturbance caused by noise or load changes.
e(t)—Error between the Setpoint and Measured Variable, e(t)=r(t)−y(t).

The control objective for the controller is to produce an output u(t) to force the process variable y(t) to track the given trajectory of its setpoint r(t) under variations of setpoint, disturbances, and process dynamics. In other words, the task of the MFA controller is to minimize the error e(t) in an online fashion. We select the objective function for the MFA control system as $$E_S(t) = \frac{1}{2}e(t)^2 \qquad (1)$$
$$= \frac{1}{2}[r(t) - y(t)]^2.$$

The minimization of e(t) is achieved by (i) the regulatory control capability of the MFA controller, and (ii) the adjustment of the MFA's weighting factors allowing the controller to deal with process dynamic changes, disturbances, and other uncertainties.

Figure 2:
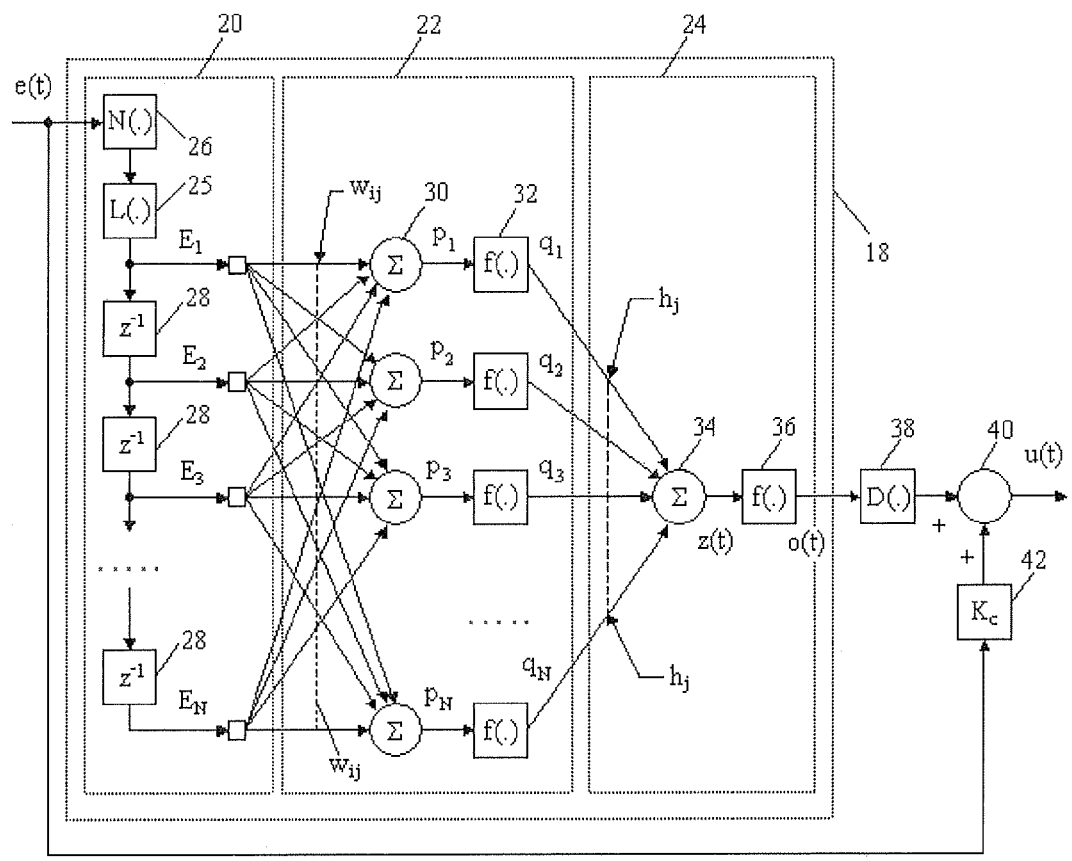
FIG. 2 is a block diagram illustrating the architecture of a single-input-single-output (SISO) Model-Free Adaptive (MFA) controller in its basic form.

FIG. 2 illustrates the core architecture of a SISO MFA controller in its basic form as described in the U.S. Pat. No. 6,556,980 B1. Used as a key component, a multilayer perceptron neural network consists of one input layer 20, one hidden layer 22 with N neurons, and one output layer 24 with one neuron. The input signal e(t) to the input layer 20 is firstly converted to a normalized error signal $E_1$ with a range of −1 to 1 by using the normalization unit 26, where N(.) denotes a normalization function. The output of the normalization unit 26 is then scaled by a scaling function L(.) 25:

$$L(\cdot) = \frac{K_c}{T_c}. \qquad (2)$$

The value of $E_1$ at time t is computed with function L(.) and N(.):

$$E_1 = \frac{K_c}{T_c}N(e(t)), \qquad (3)$$

where $K_c > 0$ is defined as controller gain and $T_c$ is the user selected process time constant. These are important parameters for the MFA controller since $K_c$ is used to compensate for the process steady-state gain and $T_c$ provides information for the dynamic behavior of the process. When the error signal is scaled with these parameters, the controller's behavior can be manipulated by adjusting the parameters.

The use of $T_c$ as part of the scaling function permits a broad choice of sample intervals, $T_s$, because the only restriction is that $T_s$ must conform to the formula $T_s < T_c/3$ based on the principles of information theory.

The $E_1$ signal then goes iteratively through a series of delay units 28, where $z^{-1}$ denotes the unit delay operator. A set of normalized and scaled error signals $E_2$ to $E_N$ is then generated. In this way, a continuous signal e(t) is converted to a series of discrete signals, which are used as the inputs to the neural network. These delayed error signals $E_i$, i=1, . . . N, are then conveyed to the hidden layer through the neural network connections. This is equivalent to adding a feedback structure to the neural network. Then the regular static multilayer neural network becomes a dynamic neural network, which is a key component for the Model-Free Adaptive controller.

Each input signal is conveyed separately to each of the neurons in the hidden layer 22 via a path weighted by an individual weighting factor $w_{ij}$, where i=1, 2, . . . N, and j=1, 2, . . . N. The inputs to each of the neurons in the hidden layer are summed by adder 30 to produce signal $p_j$. Then the signal $p_j$ is filtered by an activation function 32 to produce $q_j$, where j denotes the jth neuron in the hidden layer.

A piecewise continuous linear function f(x) mapping real numbers to [0,1] is used as the activation function in the neural network as defined by $$f(x) = 0, \text{ if } x < -\frac{b}{a} \qquad (4a)$$

$$f(x) = ax + b, \text{ if } -\frac{b}{a} \leq x \leq \frac{b}{a} \qquad (4b)$$

$$f(x) = 1, \text{ if } x > \frac{b}{a} \qquad (4c)$$

where a is an arbitrary constant and b=½.

Each output signal from the hidden layer is conveyed to the single neuron in the output layer 24 via a path weighted by an individual weighting factor $h_j$, where j=1, 2, . . . N. These signals are summed in adder 34 to produce signal z(.), and then filtered by activation function 36 to produce the output o(.) of the neural network 18 with a range of 0 to 1.

A de-normalization function 38 defined by $$D(x) = 100x, \qquad (5)$$

maps the o(.) signal back into the real space to produce the controller signal u(t).

The algorithm governing the input-output of the controller consists of the following difference equations:

$$p_j(n) = \sum_{i=1}^{N} w_{ij}(n)E_i(n), \qquad (6)$$

$$q_j(n) = f(p_j(n)), \qquad (7)$$

$$o(n) = f\left(\sum_{j=1}^{N} h_j(n)q_j(n)\right), \qquad (8)$$
$$= a\sum_{j=1}^{N} h_j(n)q_j(n) + b,$$

where the variables of function f(.) are in the range specified in Equation (4b) and bounded by the limits specified in Equations (4a) and (4c). The controller signal u(t) becomes $$u(t) = K_c(\cdot)e(t) + D(o(t)) \qquad (9)$$
$$= K_c(\cdot)e(t) + 100\left[a\sum_{j=1}^{N} h_j(n)q_j(n) + b\right],$$

where n denotes the nth iteration; o(t) is the continuous function of o(n); D(.) is the de-normalization function; and $K_c(.)>0$, the controller gain 42, is a parameter used to adjust the magnitude of the control output. This is the same $K_c$ used in the scaling function L(.) 25. It is useful to adjust the controller performance.

An online learning algorithm as described in the U.S. Pat. No. 6,556,980 B1 is an example of one algorithm that can be used to continuously update the values of the weighting factors of the MFA controller as follows:

$$\Delta w_{ij}(n) = a^2 \eta e(n) E_i(n) h_j(n), \tag{10}$$

$$\Delta h_j(n) = a\eta e(n) q_j(n). \tag{11}$$

The equations (1) through (11) work for both process direct-acting or reverse acting types. Direct-acting means that an increase in the process input will cause its output to increase, and vice versa. Reverse-acting means that an increase in the process input will cause its output to decrease, and vice versa. To keep the above equations working for both direct and reverse acting cases, e(t) is calculated differently based on the acting type of the process as follows:

| | | |
|---|---|---|
| e(t) = r(t) − y(t), | if direct acting | (12a) |
| e(t) = −[r(t) − y(t)]. | if reverse acting | (12b) |

This is a general treatment for the process acting types. It applies to all MFA controllers to be introduced below.

The algorithm for updating the weighting factors is based on the goal of minimizing the error e(t). Since this effort is the same as the control objective, the adaptation of the weighting factors can assist the controller to minimize the error while process dynamics are changing. In addition, the neural network based MFA controller "remembers" a portion of the process data providing valuable information for the process dynamics. In comparison, a digital version of the Proportional-Integral-Derivative (PID) controller remembers only the current and previous two samples. In this regard, PID has almost no memory, and MFA possesses the memory that is essential to an "intelligent" controller.

B. 3-Input-3-Output MFA Control System

Figure 3:
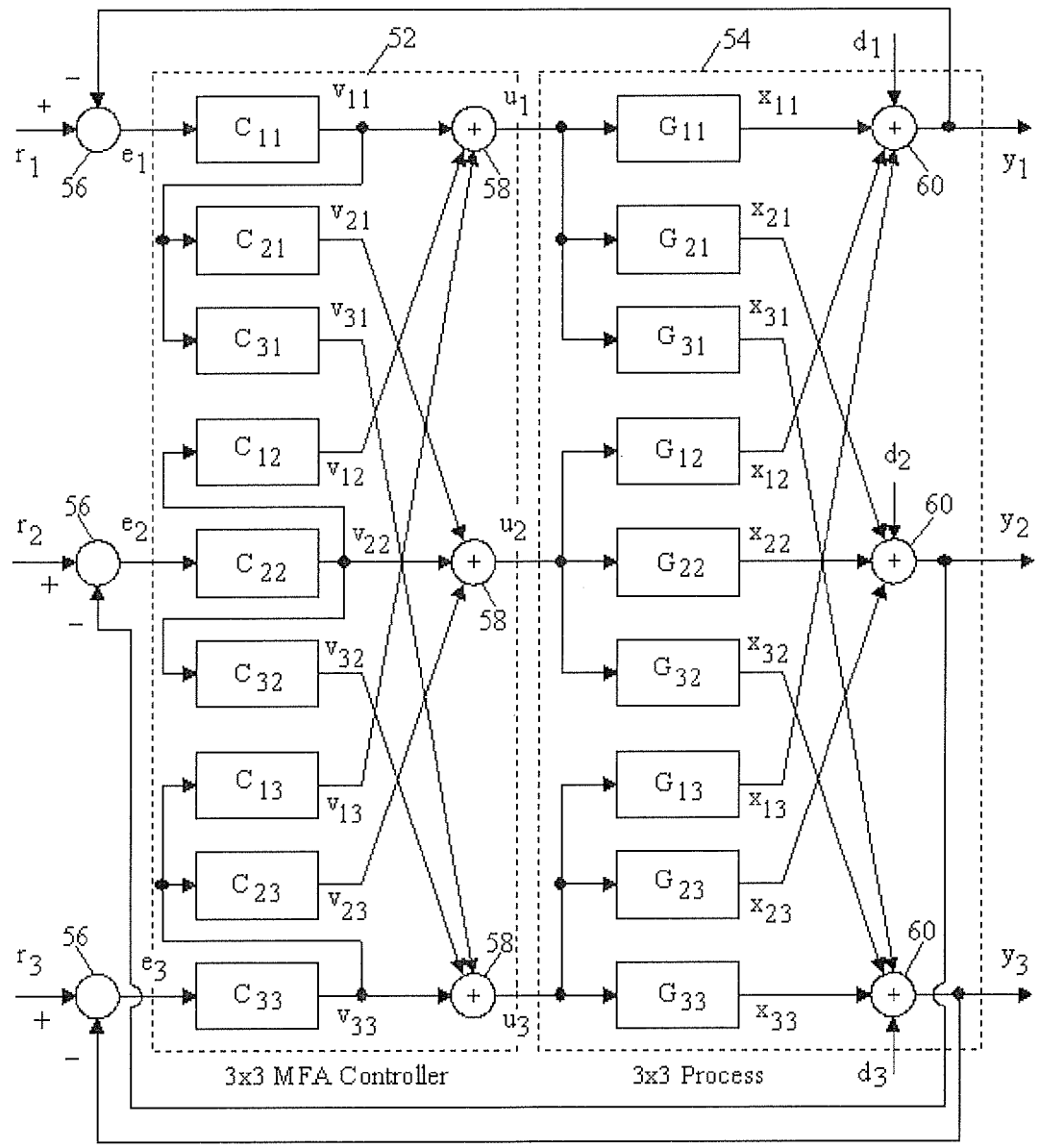
FIG. 3 is a block diagram illustrating a 3-Input-3-Output (3×3) multivariable Model-Free Adaptive (MFA) control system according to this invention.

FIG. 3 is a block diagram illustrating a 3-Input-3-Output (3×3) multivariable Model-Free Adaptive (MFA) control system according to this invention. In the 3×3 MFA control system, the 3×3 MFA controller 52 consists of three main controllers $C_{11}$, $C_{22}$, $C_{33}$, and six compensators $C_{21}$, $C_{31}$, $C_{12}$, $C_{32}$, $C_{13}$, $C_{23}$. The 3×3 process 54 has three main processes $G_{11}$, $G_{22}$, $G_{33}$, and six sub-processes $G_{21}$, $G_{31}$, $G_{12}$, $G_{32}$, $G_{13}$, $G_{23}$. The measured process variables $y_1$, $y_2$, and $y_3$ are used as the feedback signals for each of the main control loops, respectively. They are compared with the setpoints $r_1$, $r_2$, and $r_3$ at adders 56 to produce errors $e_1$, $e_2$, and $e_3$. The output of each main controller associated with one of the inputs $e_1$, $e_2$, or $e_3$ is combined with the output of the compensators associated with the other two inputs by adders 58 to produce control signals $u_1$, $u_2$, and $u_3$.

In the 3×3 MFA control system, the signals shown in FIG. 3 are as follows:

$r_1(t)$, $r_2(t)$, $r_3(t)$—Setpoint (SP) of controllers $C_{11}$, $C_{22}$ and $C_{33}$, respectively.

$y_1(t)$, $y_2(t)$, $y_3(t)$—Measured Process Variables (PV) of the 3×3 process.

$e_1(t)$, $e_2(t)$, $e_3(t)$—Error between the Setpoint and its corresponding Process Variable (PV).

$u_1(t)$, $u_2(t)$, $u_3(t)$—Outputs of the 3×3 controller used as inputs to the 3×3 process.

$d_1(t)$, $d_2(t)$, $d_3(t)$—Disturbance to $y_1$, $y_2$ and $y_3$, respectively.

$v_{11}(t)$, $v_{22}(t)$, $v_{33}(t)$—Output of the main controllers $C_{11}$, $C_{22}$ and $C_{33}$, respectively.

$v_{21}(t)$, $v_{31}(t)$ $v_{12}(t)$, $v_{32}(t)$ $v_{13}(t)$, $v_{23}(t)$—Output of compensators $C_{21}$, $C_{31}$, $C_{12}$, $C_{32}$, $C_{13}$, and $C_{23}$, respectively.

$x_{11}(t)$, $x_{21}(t)$, $x_{31}(t)$, $x_{12}(t)$, $x_{22}(t)$, $x_{32}(t)$, $x_{13}(t)$, $x_{23}(t)$, $x_{33}(t)$—Output of processes $G_{11}$, $G_{21}$, $G_{31}$, $G_{12}$, $G_{22}$, $G_{32}$, $G_{13}$, $G_{23}$, and $G_{33}$, respectively.

The process variable (PV) for each main control loop is affected by the process output of 3 sub-processes and a disturbance signal as follows:

$$y_1(t) = x_{11}(t) + x_{12}(t) + x_{13}(t) + d_1(t), \tag{13a}$$

$$y_2(t) = x_{21}(t) + x_{22}(t) + x_{23}(t) + d_2(t), \tag{13b}$$

$$y_3(t) = x_{31}(t) + x_{32}(t) + x_{33}(t) + d_3(t). \tag{13c}$$

For each main control loop, the error between the Setpoint and its corresponding Process Variable (PV) is calculated based on the acting type of the corresponding process as follows:

| | | |
|---|---|---|
| $e_1(t) = r_1(t) − y_1(t)$, | if $G_{11}$ is direct acting | (14a) |
| $e_1(t) = −[r_1(t) − y_1(t)]$, | if $G_{11}$ is reverse acting | (14b) |
| $e_2(t) = r_2(t) − y_2(t)$, | if $G_{22}$ is direct acting | (14c) |
| $e_2(t) = −[r_2(t) − y_2(t)]$, | if $G_{22}$ is reverse acting | (14d) |
| $e_3(t) = r_3(t) − y_3(t)$, | if $G_{33}$ is direct acting | (14e) |
| $e_3(t) = −[r_3(t) − y_3(t)]$, | if $G_{33}$ is reverse acting. | (14f) |

Please note that a process is said to be direct acting, if the process input increases, the process output increases, and vice versa. A process is said to be reverse acting, if the process input increases, the process output decreases, and vice versa.

For each main control loop, the controller output is a combination of the output from the controller and its corresponding compensators as follows:

$$u_1(t) = v_{11}(t) + v_{12}(t) + v_{13}(t), \tag{15a}$$

$$u_2(t) = v_{21}(t) + v_{22}(t) + v_{23}(t), \tag{15b}$$

$$u_3(t) = v_{31}(t) + v_{32}(t) + v_{33}(t). \tag{15c}$$

For each controller $C_{11}$, $C_{22}$, and $C_{33}$, the value of $E_1$ at time t is computed with a normalization function N(.) as follows:

$$E_1^{11}(n) = \frac{K_c^{11}}{T_c^{11}} N(e_1(t)), \tag{16a}$$

$$E_1^{22}(n) = \frac{K_c^{22}}{T_c^{22}} N(e_2(t)), \tag{16b}$$

$$E_1^{33}(n) = \frac{K_c^{33}}{T_c^{33}} N(e_3(t)), \tag{16c}$$

Where $K_c^{11}>0$, $K_c^{22}>0$, and $K_c^{33}>0$ are the controller gain and $T_c^{11}>0$, $T_c^{22}>0$, and $T_c^{33}>0$ are the time constants for $C_{11}$, $C_{22}$, and $C_{33}$, respectively.

The algorithm governing the input-output of the 3×3 MFA controller 52 as well as the online learning algorithm of the neural network consist of the following difference equations:

For Controller $C_{11}$:

$$p_j^{11}(n) = \sum_{i=1}^{N} w_{ij}^{11}(n) E_i^{11}(n), \quad (17a)$$

$$q_j^{11}(n) = a p_j^{11}(n) + b, \quad (17b)$$

$$v_{11}(n) = K_c^{11} e_1(n) + 100 \left[ a \sum_{j=1}^{N} h_j^{11}(n) q_j^{11}(n) + b \right], \quad (17c)$$

$$\Delta w_{ij}^{11}(n) = a^2 \eta^{11} e_1(n) E_i^{11}(n) h_j^{11}(n), \quad (17d)$$

$$\Delta h_j^{11}(n) = a \eta^{11} e_1(n) q_j^{11}(n), \quad (17e)$$

For Controller $C_{22}$ $$p_j^{22}(n) = \sum_{i=1}^{N} w_{ij}^{22}(n) E_i^{22}(n), \quad (18a)$$

$$q_j^{22}(n) = a p_j^{22}(n) + b, \quad (18b)$$

$$v_{22}(n) = K_c^{22} e_2(n) + 100 \left[ a \sum_{j=1}^{N} h_j^{22}(n) q_j^{22}(n) + b \right], \quad (18c)$$

$$\Delta w_{ij}^{22}(n) = a^2 \eta^{22} e_2(n) E_i^{22}(n) h_j^{22}(n), \quad (18d)$$

$$\Delta h_j^{22}(n) = a \eta^{22} e_2(n) q_j^{22}(n). \quad (18e)$$

For Controller $C_{33}$ $$p_j^{33}(n) = \sum_{i=1}^{N} w_{ij}^{33}(n) E_i^{33}(n), \quad (19a)$$

$$q_j^{33}(n) = a p_j^{33}(n) + b, \quad (19b)$$

$$v_{33}(n) = K_c^{33} e_2(n) + 100 \left[ a \sum_{j=1}^{N} h_j^{33}(n) q_j^{33}(n) + b \right], \quad (19c)$$

$$\Delta w_{ij}^{33}(n) = a^2 \eta^{33} e_2(n) E_i^{33}(n) h_j^{33}(n), \quad (19d)$$

$$\Delta h_j^{33}(n) = a \eta^{33} e_2(n) q_j^{33}(n). \quad (19e)$$

In these equations, n denotes the nth iteration; a is an arbitrary constant and b=½; $\eta^{11}$>0, $\eta^{22}$>0, and $\eta^{33}$>0 are the learning rate for $C_{11}$, $C_{22}$, and $C_{33}$, respectively; $p_j^{11}$, $p_j^{22}$, $p_j^{33}$, $q_j^{11}$, $q_j^{22}$, and $q_j^{33}$ are variables of the neural network for $C_{11}$, $C_{22}$, and $C_{33}$, respectively; $w_{ij}^{11}$, $w_{ij}^{22}$, $w_{ij}^{33}$, $h_j^{11}$, $h_j^{22}$, and $h_j^{33}$ are weighting factors of the neural network for $C_{11}$, $C_{22}$, and $C_{33}$, respectively; $K_c^{11}$>0, $K_c^{22}$>0, and $K_c^{33}$>0 are the controller gain for $C_{11}$, $C_{22}$, and $C_{33}$, respectively; and $E_i^{11}(n)$, $E_i^{22}(n)$, and $E_i^{33}(n)$ are the delayed signals of $E_1^{11}(n)$, $E_1^{22}(n)$, and $E_1^{33}(n)$, respectively. In addition, the a and b constants in Equations (17b), (17c), (18b), (18c), (19b), and (19c) are in the range specified in Equation (4b), and bounded by the limits specified in Equations (4a) and (4c).

The compensators $C_{21}$, $C_{31}$, $C_{12}$, $C_{32}$, $C_{13}$, and $C_{23}$ are designed to include a first-order dynamic block based on the following Laplace transfer functions:

$$C_{21}(S) = \frac{V_{21}(S)}{V_{11}(S)} = \frac{K_s^{21} K_c^{21}}{T_c^{21} S + 1}. \quad (20a)$$

$$C_{31}(S) = \frac{V_{31}(S)}{V_{11}(S)} = \frac{K_s^{31} K_c^{31}}{T_c^{31} S + 1}. \quad (20b)$$

$$C_{12}(S) = \frac{V_{12}(S)}{V_{22}(S)} = \frac{K_s^{12} K_c^{12}}{T_c^{12} S + 1}. \quad (20c)$$

$$C_{32}(S) = \frac{V_{32}(S)}{V_{22}(S)} = \frac{K_s^{32} K_c^{32}}{T_c^{32} S + 1}. \quad (20d)$$

$$C_{13}(S) = \frac{V_{13}(S)}{V_{33}(S)} = \frac{K_s^{13} K_c^{13}}{T_c^{13} S + 1}. \quad (20e)$$

$$C_{23}(S) = \frac{V_{23}(S)}{V_{33}(S)} = \frac{K_s^{23} K_c^{23}}{T_c^{23} S + 1}. \quad (20f)$$

In these equations, S is the Laplace transform operator; $V_{11}(S)$, $V_{22}(S)$, $V_{33}(S)$, $V_{21}(S)$, $V_{31}(S)$, $V_{12}(S)$, $V_{32}(S)$, $V_{13}(S)$, and $V_{23}(S)$ are the Laplace transform of signals $v_{11}(t)$, $v_{22}(t)$, $v_{33}(t)$, $v_{21}(t)$, $v_{31}(t)$, $v_{12}(t)$, $v_{32}(t)$, $v_{13}(t)$, and $v_{23}(t)$, respectively; $K_c^{21}$>0, $K_c^{31}$>0, $K_c^{12}$>0, $K_c^{32}$>0, $K_c^{13}$>0, and $K_c^{23}$>0 are the compensator gain; and $T_c^{21}$>0, $T_c^{31}$>0, $T_c^{12}$>0, $T_c^{22}$>0, $T_c^{13}$>0, and $T_c^{23}$>0 are the compensator time constants. In the applications where only static compensation is considered, the corresponding time constant can be set to 0. If the sub-process $G_{21}$=0, meaning that there is no interconnection from loop 1 to loop 2, the compensator $C_{21}$ should be disabled by selecting $K_c^{21}$=0. Similarly, if $G_{12}$=0, one should select $K_{12}$=0 to disable $C_{12}$, and so on.

$K_s^{lm}$ is the compensator sign factor, which is selected based on the acting types of the sub-processes as follows:

$$K_s^{lm}=1, \text{ if } G_{ll} \text{ and } G_{lm} \text{ have different acting types} \quad (21a)$$

$$K_s^{lm}=-1, \text{ if } G_{ll} \text{ and } G_{lm}, \text{ have the same acting type} \quad (21b)$$

where l=1, 2, 3; m=1, 2, 3; and l≠m. For instance, $K_s^{12}$=1 if $G_{11}$ and $G_{12}$ have different acting types, and $K_s^{12}$=−1 if $G_{11}$ and $G_{12}$ have the same acting types.

For control loop 1, the main controller $C_{11}$ and its corresponding compensators $C_{12}$ and $C_{13}$ are in one group. The objective is to control the main process $G_{11}$, and compensate for the interactions from sub-processes $G_{12}$ and $G_{13}$. In this case, the compensation signal $V_{12}$ and $V_{13}$ are used to deal with the interaction signals $X_{12}$ and $X_{13}$ from sub-processes $G_{12}$ and $G_{13}$, respectively. Notice that the interactions are from loop 2 and 3. For control loop 2, the main controller $C_{22}$ and its corresponding compensators $C_{21}$ and $C_{23}$ are in one group. For control loop 3, the main controller $C_{33}$ and its corresponding compensators $C_{31}$ and $C_{32}$ are in one group.

Our design philosophy for multivariable MFA control is not attempting a perfect cancellation for the loop interactions. Therefore, a simplified yet logical design for the estimated compensator time constant is as follows:

$$C_{21}(S) = \frac{V_{21}(S)}{V_{11}(S)} = \frac{K_s^{21} K_c^{21}}{T_c^{22} S + 1}. \quad (22a)$$

$$C_{31}(S) = \frac{V_{31}(S)}{V_{11}(S)} = \frac{K_s^{31} K_c^{31}}{T_c^{33} S + 1}. \quad (22b)$$

$$C_{12}(S) = \frac{V_{12}(S)}{V_{22}(S)} = \frac{K_s^{12} K_c^{12}}{T_c^{11} S + 1}. \quad (22c)$$

-continued $$C_{32}(S) = \frac{V_{32}(S)}{V_{22}(S)} = \frac{K_s^{32} K_c^{32}}{T_c^{33} S + 1}. \quad (22d)$$

$$C_{13}(S) = \frac{V_{13}(S)}{V_{33}(S)} = \frac{K_s^{13} K_c^{13}}{T_c^{11} S + 1}. \quad (22e)$$

$$C_{23}(S) = \frac{V_{23}(S)}{V_{33}(S)} = \frac{K_s^{23} K_c^{23}}{T_c^{22} S + 1}. \quad (22f)$$

In these equations, $T_c^{11}>0$, $T_c^{22}>0$, and $T_c^{33}>0$ are the time constants for the main controllers $C_{11}$, $C_{22}$, and $C_{33}$, respectively. They will be entered by the user when configuring the main controllers $C_{11}$, $C_{22}$, and $C_{33}$, This design simplifies controller configuration with less parameter entry requirements of 6 compensator time constants. Since MFA controllers have inherent adaptive capability and a wider robust control range, the 3×3 MFA controller with simplified compensator design can still produce excellent control performance for seriously coupled 3×3 processes.

C. Conventional Boiler-Turbine-Generator (BTG) Units

Figure 4:
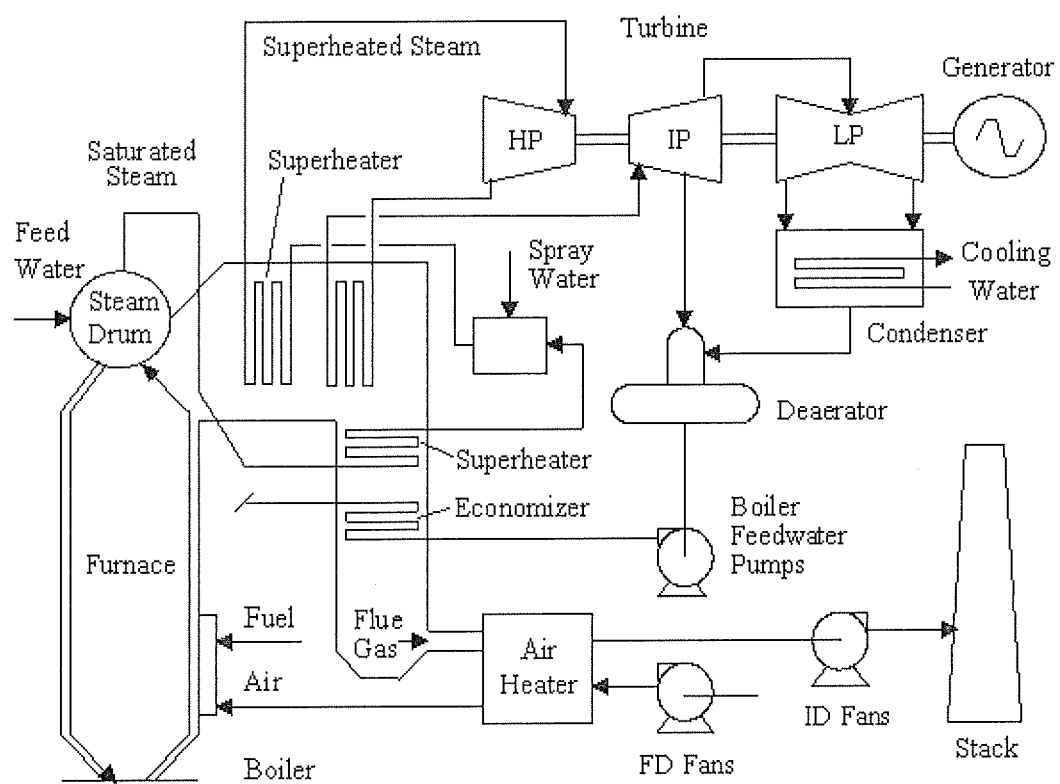
FIG. 4 is a schematic representation of a boiler-turbine-generator (BTG) unit of a power plant comprising a conventional boiler.

A conventional coal, oil, or natural gas fired power plant consists of three key components: (1) Boiler, (2) Turbine, and (3) Generator. The Boiler produces superheated steam to turn the Turbine to allow the Generator to generate electricity. Operating as a set, the combined Boiler, Turbine, Generator, and all auxiliaries make up a BTG unit. FIG. 4 is a schematic representation of a Boiler-Turbine-Generator (BTG) unit of a power plant comprising a conventional boiler. Conventional here means that the boiler is sub-critical with a steam drum and also has a fixed bed in comparison to a fluidized-bed boiler.

To produce steam for power generation, water must be boiled. Feedwater first enters the Economizer where initial heating to almost boiling occurs. It then passes into a Steam Drum at the top of the boiler. From there the water recirculates through the Evaporator tubes lining inside the Furnace and back to the Steam Drum. About 20% of the water boils off and leaves the Drum through steam pipes in the top of the Drum. Superheater tubes mounted in the hottest part of the boiler heat the steam one final time.

The superheated steam from the Boiler is fed to the Turbine which is coupled with the Generator. Steam is exhausted from the Turbine at a low pressure, condensed, and then pumped back to the Boiler under pressure. The Turbine has three sections on a common shaft, the high-pressure cylinder (HP), the intermediate-pressure cylinder (IP), and one or more low-pressure cylinders (LP). Steam exhausted from the HP section is taken back to the Reheater to be reheated to its original temperature. In this way, more energy is put into the cycle without requiring further latent heat, thus improving the overall efficiency. From the Reheater, the steam goes to the IP section. Steam exhausted from the IP Section goes directly to the LP section and then passes to the Condenser which is operated at a near vacuum state. Forced draft (FD) fans are used to provide combustion air to the windbox for distribution to the burners. Induced draft (ID) fans are usually equipped to draw flue gases from the Furnace and drive them up the Stack.

The fuel such as coal is burned with a controlled amount of air to insure complete combustion and minimum pollution. Oil and natural gas are readily burned in the furnace; coal must be ground to a fine powder, known as pulverized fuel, before it can be readily burned. A large percent of boilers used for power and steam generation today are conventional sub-critical pulverized coal (PC) boilers. Compared with more advanced boilers, they are lower in efficiency, higher in emissions, more fuel sensitive, and have less product versatility.

D. Advanced Power Boilers

Compared with sub-critical fixed bed conventional boilers, there are 3 types of advanced boilers: (1) Once-Through Supercritical (OTSC) Boilers, (2) Circulating Fluidized-Bed (CFB) Boilers, and (3) Once-Through Supercritical Circulating Fluidized-Bed (OTSC CFB) Boilers. Generally speaking, a power plant that is equipped with any number of advanced boilers can be called an advanced power plant.

Boilers used in energy plants are either "drum" or "once-through" types, depending on how the boiler water is circulated. Heat is transferred through the furnace tubes and into the water passing through the tubes to generate steam. In drum-type boilers, the steam-flow rate is typically controlled by the fuel-firing rate. In once-through boilers, the steam-flow rate is established by the boiler feedwater and the superheated steam temperature is controlled by the fuel-firing rate. A boiler is called supercritical when the master steam pressure is over 22.129 Mpa. In general, when water goes over the critical point (Pressure=22.129 Mpa, and Temperature=234 degree C.), it becomes steam. Therefore, a steam drum cannot be used and the Once-through design is the only choice for supercritical boilers. Once-through supercritical boilers run at higher steam temperature and pressure so that better energy efficiency is achieved. But they are difficult to control as summarized in Table 2.

TABLE 2

| Challenges | Description and Comments |
| --- | --- |
| Severely Nonlinear and Multivariable | The relationship of throttle valve, fuel feed, and water feed to power, steam pressure, and steam temperature are nonlinear and interacting. |
| Serious Coupling | Because of the once-through design, there exists serious coupling between the boiler and turbine units. |
| Large Disturbances | Since there is no steam drum, any changes in the throttle valve position will cause a direct disturbance to the boiler pressure and temperature. |
| Large load and operating condition changes | Boiler needs to run in both subcritical and supercritical modes causing large load and operating condition changes. |

Circulating fluidized-bed (CFB) boilers are becoming strategically important in power and energy generation. The unique design of CFB boilers allows fuel such as coal powders to be fluidized in the air so that they have better contact with the surrounding air for better combustion. CFB boilers can burn low-grade materials such as waste coal, wood, and refuse derived fuel. Most importantly, less emissions such as COx and NOx are produced compared to conventional boilers. The critical process variables and their control challenges for a CFB boiler are listed in Table 3.

TABLE 3

| Process Variable | Control Challenges of CFB Boilers |
| --- | --- |
| Master Steam Pressure | Nonlinear, tight specifications, large delay time, large disturbance caused by load changes and poor feed actuation, etc. |
| Steam Temperature | Large time delay and time-varying. |
| Bed Temperature | Multi-input-single-output process, multiple constraints, very critical since poor bed temp control results in serious NOx emissions. |
| Excess Oxygen | It is related to multiple emission constraints, varying heating value of flexible fuel, and condition of the oxygen sensors. |

TABLE 3-continued

| Process Variable | Control Challenges of CFB Boilers |
|---|---|
| Furnace Negative Pressure | Multiple fans and dampers to hold proper negative pressure for the furnace. |
| Coal or Fuel Feed | Nonlinear, poor actuation, coal or fuel feed jams, etc. |
| Primary Air and Secondary Air | Multiple fans and dampers to hold the proper CFB circulating condition and fuel-air-ratio. Extremely sensitive to bed temperature. |

For a CFB boiler, the control challenges are mainly related to the combustion process of its furnace. The combustion process control of a CFB boiler is not in the scope of this patent.

E. Supercritical CFB Boilers and BTG Units

The Once-through Supercritical Circulating Fluidized-bed (OTSC CFB) boiler combines the merits of once-through supercritical and circulating fluidized-bed technologies. As a strategically important clean coal technology, OTSC CFB boilers can significantly improve combustion and energy efficiency, reduce emissions, and have fuel flexibility. It is the most promising boiler for future energy plants because of all its outstanding advantages.

Figure 5:
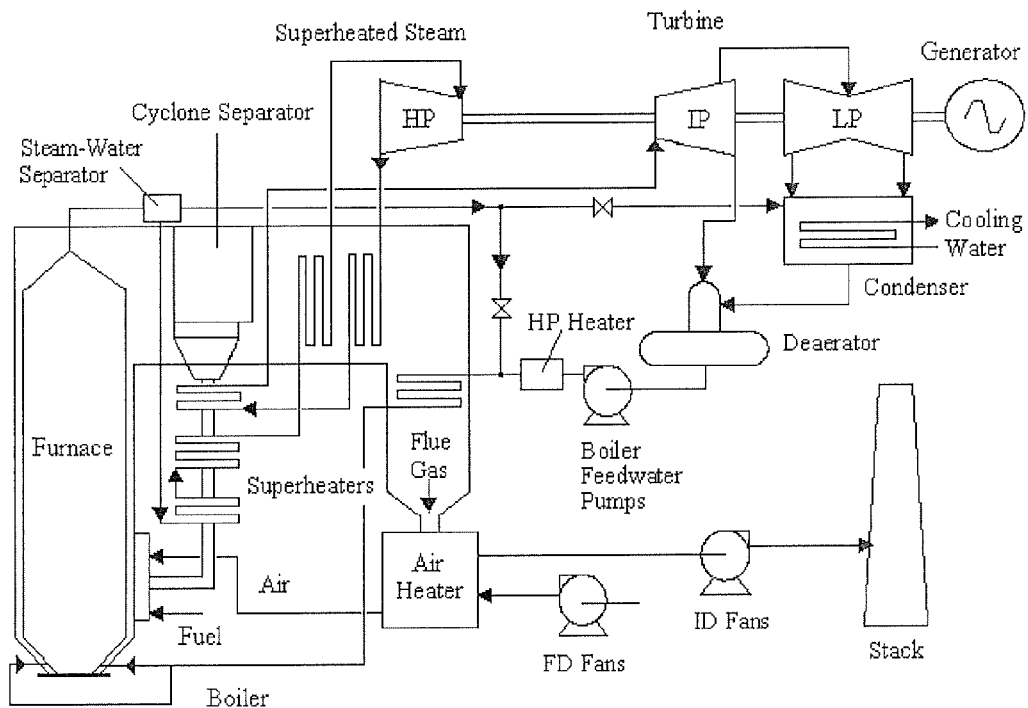
FIG. 5 is a schematic representation of a boiler-turbine-generator (BTG) unit of a power plant comprising a supercritical circulating fluidized-bed boiler.

A Supercritical CFB boiler based electric power plant also consists of three key components: (1) Boiler, (2) Turbine, and (3) Generator. Similar to the conventional boiler, the OTSC CFB boiler produces superheated steam to turn the turbine to allow the generator to generate electricity. Operating as a set, the combined Boiler, Turbine, Generator, and all auxiliaries make up a BTG unit. FIG. 5 is a schematic representation of a Boiler-Turbine-Generator (BTG) unit of a power plant comprising a Supercritical Circulating Fluidized-bed boiler. Feedwater first enters the Economizer where initial heating to almost boiling occurs. It then passes into the Cyclone Separator at the top of the Boiler. From there the water recirculates through the Superheaters. The superheated steam is fed directly to the Turbine which is coupled with the Generator. Steam is exhausted from the Turbine at a low pressure, condensed, and then pumped back to the boiler under pressure.

For an OTSC CFB boiler, most of the control challenges in Once-Through Supercritical boilers and in CFB boilers still exist. Since the Supercritical CFB boiler combines the chaotic operating conditions of a CFB boiler and the once-through nature of a supercritical boiler, the control challenges could double. For such a boiler, maintaining a dynamic material and energy balance becomes a big challenge. In general, for an OTSC CFB boiler, its BTG process and its CFB combustion process are much more dependent on a good automatic control system in order to keep the energy and material balance. If not careful, the entire system can get into vicious cycles causing serious consequences. For instance, when a steam demand increases, it will cause the steam pressure to go down, which will quickly affect the boiler firing and then the fluidized-bed conditions. The changed combustion condition will result in more changes in steam temperature and pressure and therefore a vicious cycle will build up causing major operation and safety problems. Conventional control methods including coordinated control of steam turbine and boiler control will have major difficulties in controlling OTSC CFB boilers.

In a power generation network, a BTG unit may be base-loaded to generate at a constant rate, or may cycle up and down as required by an automatic dispatch system. In either case, the boiler control system manipulates the firing rate of the furnace to generate the steam required to satisfy the demand for power. It is also necessary to maintain an adequate supply of feedwater and the correct mixture of fuel and air for safe and economic combustion. These requirements are actually the same for a conventional BTG unit or a BTG unit that employs an advanced power boiler such as a Supercritical boiler, a CFB boiler, or a Supercritical CFB boiler.

Figure 6:
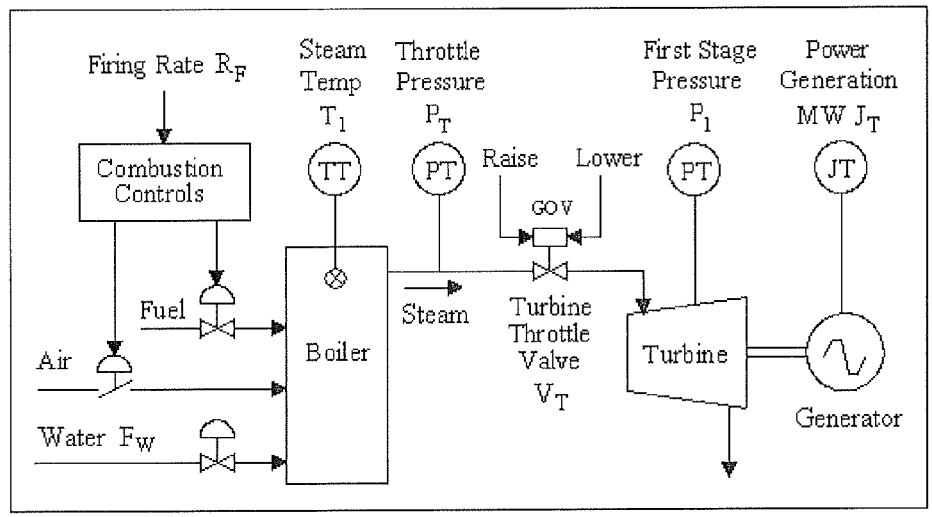
FIG. 6 is a diagram illustrating the key process variables of the boiler-turbine-generator (BTG) unit of a power plant.

FIG. 6 is a diagram illustrating a simplified schematic of the BTG unit along with the key process variables, which are described in Table 4.

TABLE 4

| Variable | Symbol | Description |
|---|---|---|
| Throttle Valve Position | $V_T$ | The valve used for the Turbine governor control. |
| Firing Rate | $R_F$ | The firing rate of the boiler is changed by manipulating the amounts of air and fuel to the burners. Increasing the firing rate generates more steam. |
| Water Feed | $F_W$ | The feed water flow to the boiler. |
| Power Output | $J_T$ | The power measurement is used to indicate and control the power generation of the BTG unit. |
| Throttle Pressure | $P_T$ | The throttle pressure is actually the steam supply pressure to the turbine. It indicates the state of balance between the supply and demand for steam. Rising throttle pressure indicates that the steam supply exceeds demand and falling throttle pressure indicates that the steam demand exceeds supply. The automatic controller for this purpose is the Turbine Governor. |
| Steam Flow | Fs | The steam flow. |
| Steam Temp 1 | $T_1$ | Temperature of superheated steam in position 1. |

F. MFA Control System Design Method and MFA Control of BTG Units

In this section, we introduce a novel multivariable control system design method which includes the following key ideas:

1. The control system design is based on qualitative analysis of the process input and output variables. No detailed quantitative analysis or process models are required.
2. For a multivariable process, use S (Strong), M (Medium), and W (Weak) to represent the degree of connections between the input and output of each sub-process. Use the plus or minus sign to represent whether the process is direct or reverse acting.
3. Properly pair the process input and output variables so that the main processes are open-loop stable and have a strong direct or reverse acting relationship to assure good controllability.
4. The remaining sub-processes should have medium, weak, or even no connections between their input and output variables. Their acting types do not matter.
5. If a sub-process has a strong relationship between its input and output, either improve the process or carefully launch the control system.

Based on this control system design method, an MFA control system is designed to control the critical process variables of the BTG unit including Power ($J_T$), Steam Throttle Pressure ($P_T$), and Steam Temperature $T_1$. The process has 3 inputs and 3 outputs and is called a Power-Pressure-Temperature (PPT) process. We pair the variables to form 9 sub-processes $G_{11}, G_{21}, \ldots, G_{33}$ as listed in Table 5.

TABLE 5

| Process Inputs - | Process Outputs - Process Variables to be Controlled | | |
|---|---|---|---|
| Manipulated Variables | Power ($J_T$) | Throttle Pressure ($P_T$) | Steam Temp ($T_1$) |
| Firing Rate ($R_F$) | $G_{11}$ | $G_{21}$ | $G_{31}$ |
| Throttle Valve ($V_T$) | $G_{12}$ | $G_{22}$ | $G_{32}$ |
| Water Feed ($F_W$) | $G_{13}$ | $G_{23}$ | $G_{33}$ |

The importance of the variable pairing is that we want to make sure the 3 main processes $G_{11}$, $G_{22}$, and $G_{33}$ have a strong direct or reverse acting relationship so that they have good controllability. The detailed qualitative input and output relationship among all 9 sub-processes is analyzed and presented in Table 6.

TABLE 6

| Process | Input-Output | Acting Type | Qualitative Input and Output Relationship |
|---|---|---|---|
| $G_{11}$ | $R_F$-$J_T$ | S | Strong direct acting. When the firing rate increases, the power will increase but the relationship is quite nonlinear. |
| $G_{21}$ | $R_F$-$P_T$ | M to S | When the firing rate increases, the throttle pressure will increase gradually. |
| $G_{31}$ | $R_F$-$T_1$ | M to S | When the firing rate increases, the steam temperature will increase gradually. |
| $G_{12}$ | $V_T$-$J_T$ | +/− S | When the throttle valve increases, the power will increase immediately for a short period of time. If the firing rate does not change, power will go down and back to its original position. |
| $G_{22}$ | $V_T$-$P_T$ | −S | Strong reverse acting. When the throttle valve position increases, the throttle pressure decreases. |
| $G_{32}$ | $V_T$-$T_1$ | W | When the throttle valve increases, it has little effect on the temperature. |
| $G_{13}$ | $F_W$-$J_T$ | +/−M | When the water feed increases, the power will increase for a short period of time and then decrease quite significantly. |
| $G_{23}$ | $F_W$-$P_T$ | +/−M | When the water feed increases, the throttle pressure will increase immediately and then decrease gradually. |
| $G_{33}$ | $F_W$-$T_1$ | −S | Strong reverse acting. When the water feed increases, it will cause the steam temperature to decrease. |

Based on the variable pairing and control system design, the 3×3 MFA controller illustrated in FIG. 3 can be readily applied to control the PPT process of a BTG unit. The BTG unit may include a conventional power boiler or an advanced power boiler such as a Supercritical boiler, a CFB boiler, or a Supercritical CFB boiler.

Figure 7:
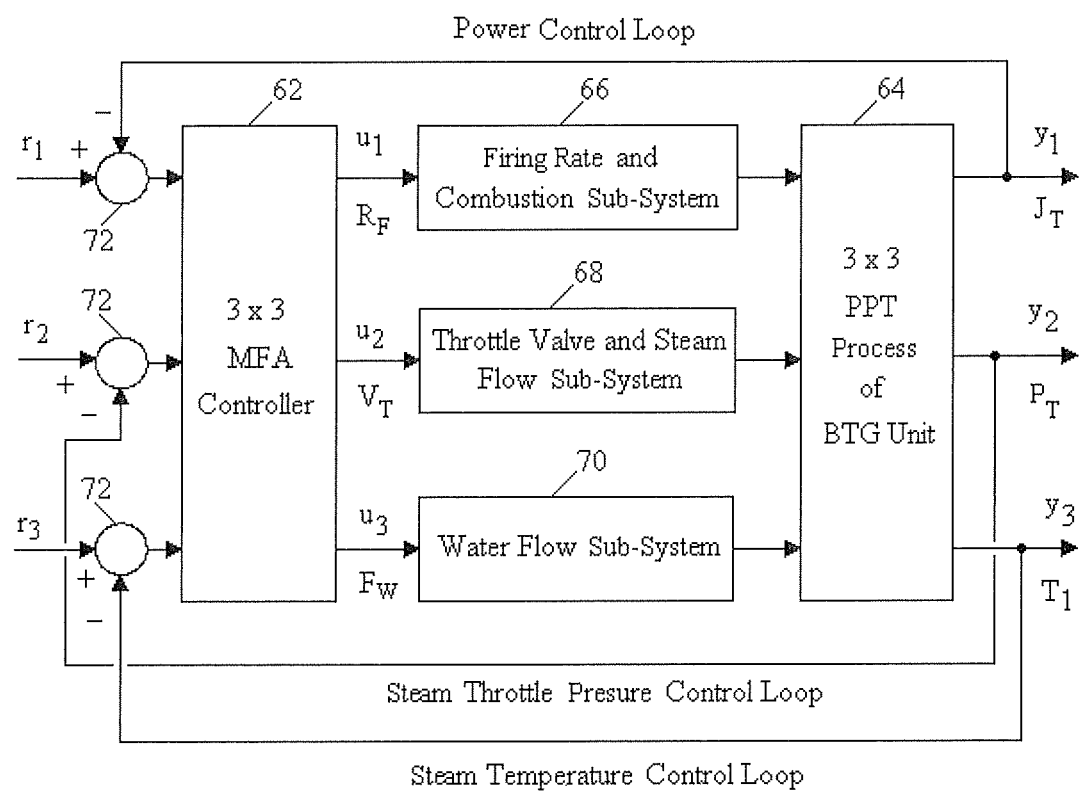
FIG. 7 illustrates the block diagram of a 3×3 MFA control system for controlling the 3×3 Power-Pressure-Temperature (PPT) process of a Boiler-Turbine-Generator (BTG) unit according to this invention.

FIG. 7 illustrates the block diagram of a 3×3 MFA control system for controlling the 3×3 Power-Pressure-Temperature (PPT) process of a Boiler-Turbine-Generator (BTG) unit according to this invention. The MFA control system comprises a 3×3 MFA controller 62, a 3×3 PPT process of a BTG unit 64, a Firing Rate and Combustion Sub-system 66, a Throttle Valve and Steam Flow Sub-system 68, and a Water Flow Sub-system 70. Each of the sub-systems may include various control loops. For instance, the Water Flow Sub-system typically includes a water flow control loop. In this case, the control signal u3 will be used as the setpoint for the water flow control loop, which is the inner loop of the cascade control system. Conventional control methods could be used to control these sub-systems. Therefore, they are not in the scope of this patent.

The 3×3 PPT process has nine sub-processes $G_{11}$ through $G_{33}$ as listed in Table 6. The process variables $y_1$, $y_2$, and $y_3$ are Power ($J_T$), Steam Throttle Pressure ($P_T$), and Steam Temperature $T_1$, respectively. They are the feedback signals for each of the main control loops and compared with the setpoints $r_1$, $r_2$ and $r_3$ at adders 72 to produce error signals $e_1$, $e_2$, and $e_3$. The outputs of the 3×3 MFA controller $u_1$, $u_2$, $u_3$ manipulate the manipulated variables Firing Rate ($R_F$), Throttle Valve ($V_T$), and Water Feed ($F_W$) to control the Power ($J_T$), Steam Throttle Pressure ($P_T$), and Steam Temperature $T_1$, respectively.

Figure 8:
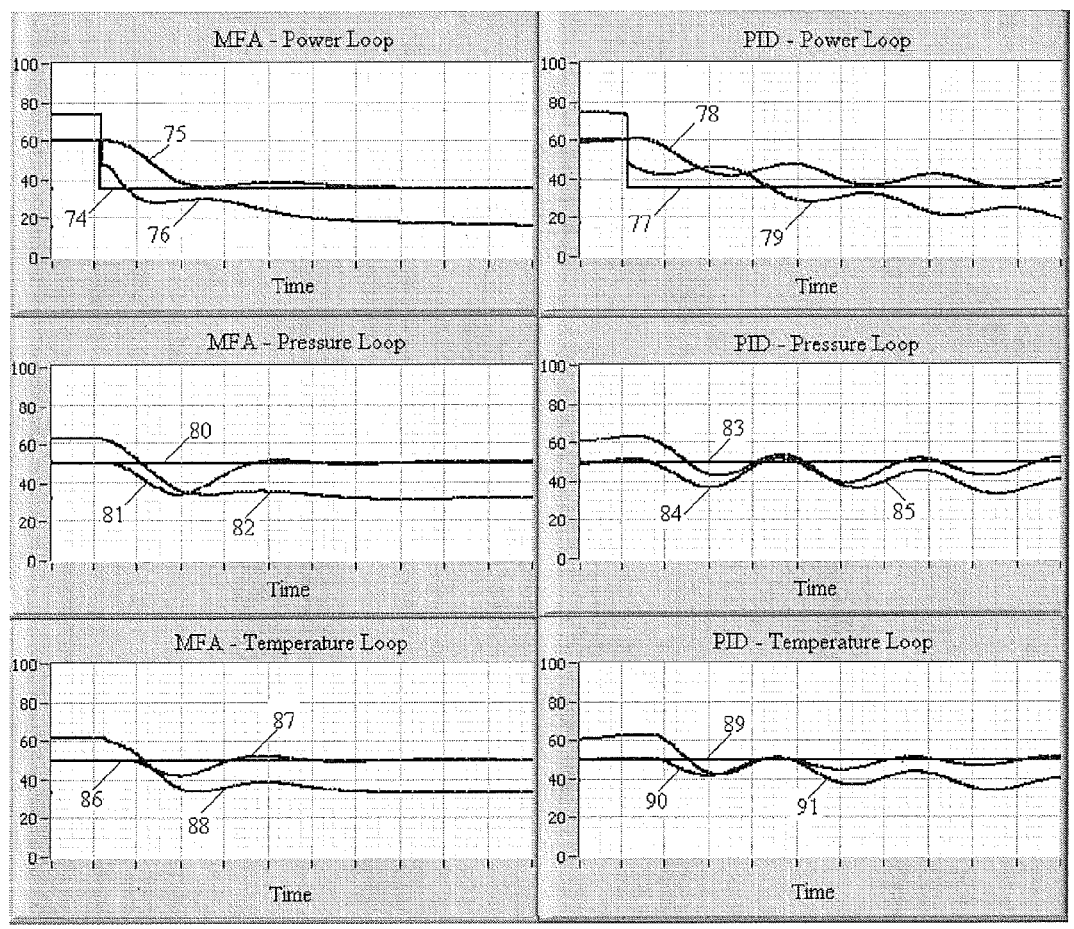
FIG. 8 is a time-amplitude diagram comparing the control performance of a 3×3 MFA control system versus a PID control system for controlling two identical PPT processes of a BTG unit, where the setpoint for Power is stepped down.

FIG. 8 is a time-amplitude diagram comparing the control performance of a 3×3 MFA control system versus a PID control system for controlling two identical PPT processes of a BTG unit, where the setpoint for Power is stepped down. In FIG. 8, curves 74, 75, 76 are SP, PV, OP of the MFA Power loop, and curves 77, 78, 79 are SP, PV, OP of the PID Power loop, respectively. Curves 80, 81, 82 are SP, PV, OP of the MFA Pressure loop, and curves 83, 84, 85 are SP, PV, OP of the PID Pressure loop, respectively. Curves 86, 87, 88 are SP, PV, OP of the MFA Temperature loop, and curves 89, 90, 91 are SP, PV, OP of the PID Temperature loop, respectively. The loop interactions can be clearly seen. When the Power SP (Signals 74 and 77) is changed from 60 to 35, the controller OP (Signals 76 and 79) produces the control actions trying to force the Power PV (Signals 75 and 78) to track its setpoint. Since it is a 3×3 process, this action inevitably causes the Pressure PV and Temperature PV to change as well.

Figure 9:
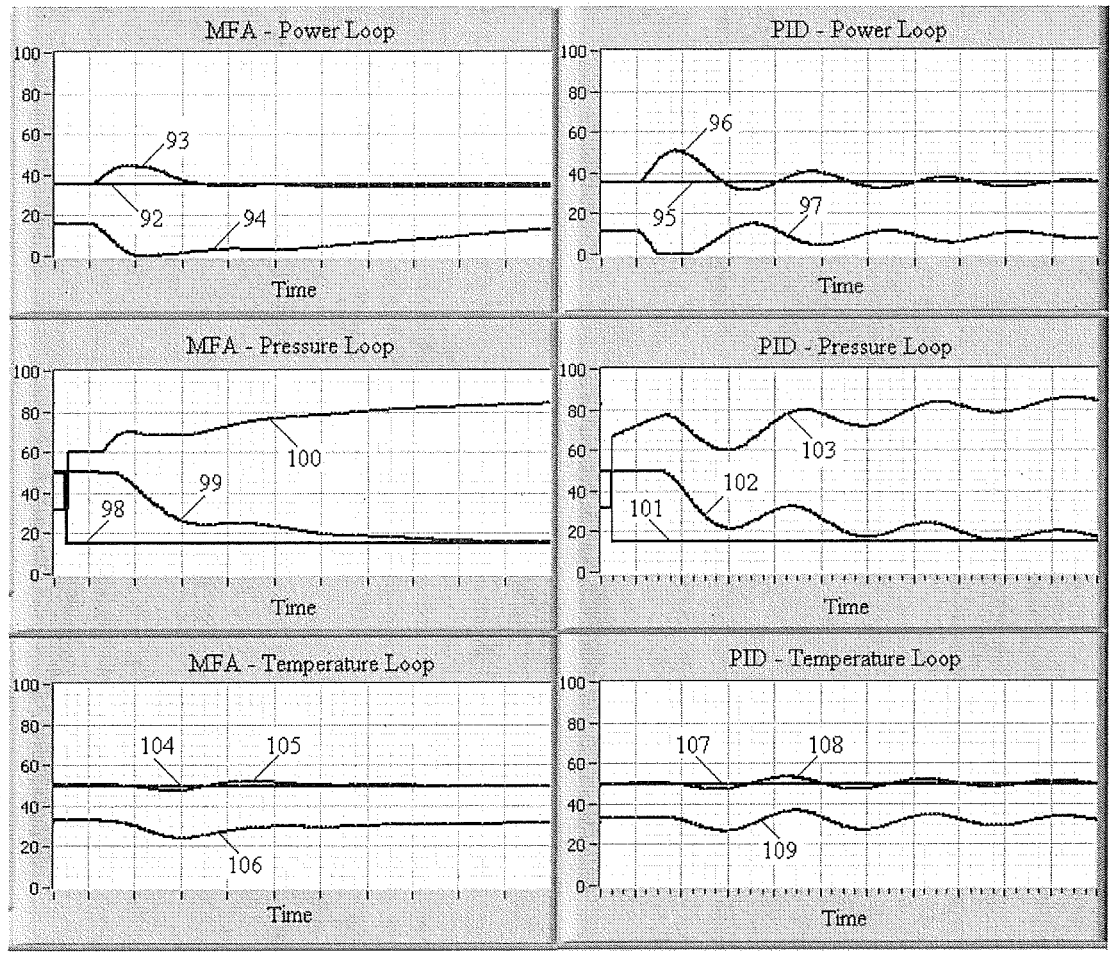
FIG. 9 is a time-amplitude diagram comparing the control performance of a 3×3 MFA control system versus a PID control system for controlling two identical PPT processes of a BTG unit, where the setpoint for Steam Throttle Pressure is stepped down.

FIG. 9 is a time-amplitude diagram comparing the control performance of a 3×3 MFA control system versus a PID control system for controlling two identical PPT processes of a BTG unit, where the setpoint for Steam Throttle Pressure is stepped down. In FIG. 9, curves 92, 93, 94 are SP, PV, OP of the MFA Power loop, and curves 95, 96, 97 are SP, PV, OP of the PID Power loop, respectively. Curves 98, 99, 100 are SP, PV, OP of the MFA Pressure loop, and curves 101, 102, 103 are SP, PV, OP of the PID Pressure loop, respectively. Curves 104, 105, 106 are SP, PV, OP of the MFA Temperature loop, and curves 107, 108, 109 are SP, PV, OP of the PID Temperature loop, respectively. Please notice that the throttle valve change has little effect on the temperature loop as described for sub-process $G_{32}$ in Table 6.

Figure 10:
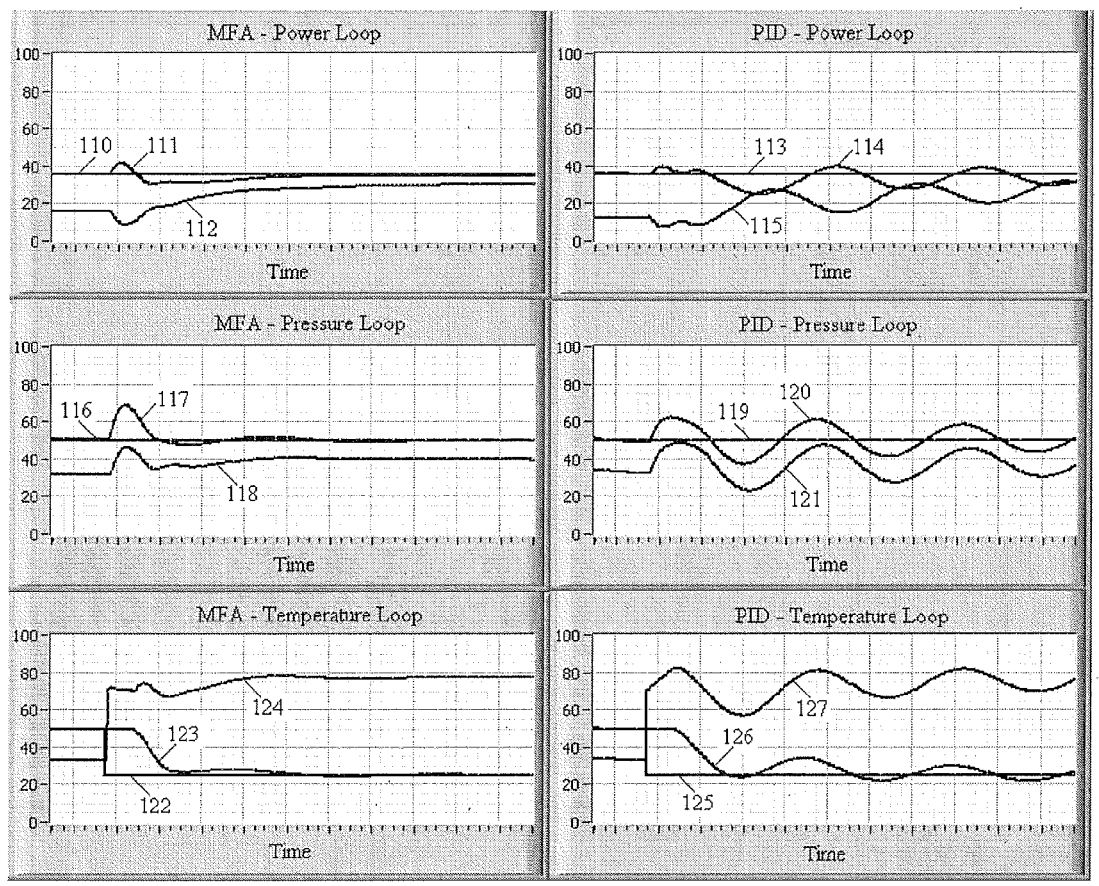
FIG. 10 is a time-amplitude diagram comparing the control performance of a 3×3 MFA control system versus a PID control system for controlling two identical PPT processes of a BTG unit, where the setpoint for Steam Temperature is stepped down.

FIG. 10 is a time-amplitude diagram comparing the control performance of a 3×3 MFA control system versus a PID control system for controlling two identical PPT processes of a BTG unit, where the setpoint for Steam Temperature is stepped down. In FIG. 10, curves 110, 111, 112 are SP, PV, OP of the MFA Power loop, and curves 113, 114, 115 are SP, PV, OP of the PID Power loop, respectively. Curves 116, 117, 118 are SP, PV, OP of the MFA Pressure loop, and curves 119, 120, 121 are SP, PV, OP of the PID Pressure loop, respectively. Curves 122, 123, 124 are SP, PV, OP of the MFA Temperature loop, and curves 125, 126, 127 are SP, PV, OP of the PID Temperature loop, respectively. As illustrated, the MFA control system can suppress the disturbances in the Power and Pressure loops caused by the big change in the water flow. In contrast, the same disturbance caused the PID loops to swing.

Figure 11:
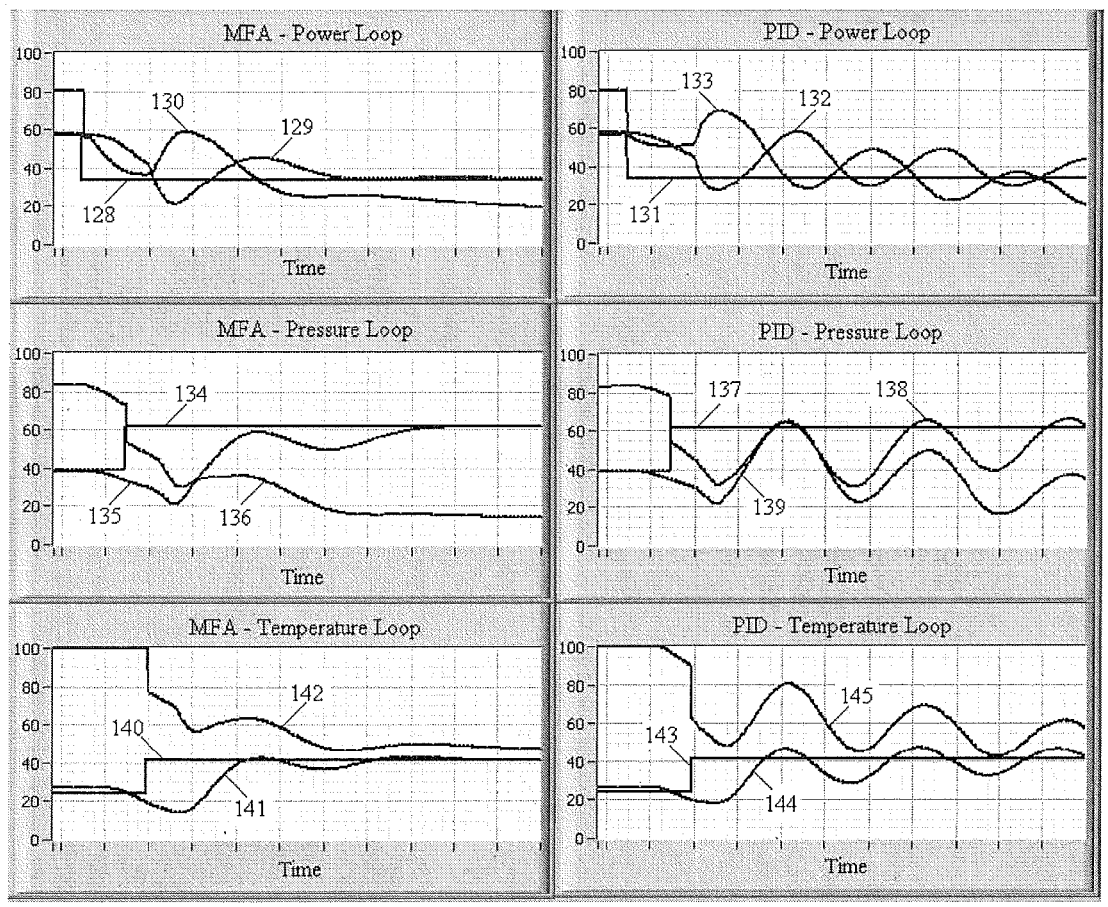
FIG. 11 is a time-amplitude diagram comparing the control performance of a 3×3 MFA control system versus a PID control system for controlling two identical PPT processes of a BTG unit, where the setpoints for Power, Throttle Pressure, and Steam Temperature all have step changes.

FIG. 11 is a time-amplitude diagram comparing the control performance of a 3×3 MFA control system versus a PID control system for controlling two identical PPT processes of a BTG unit, where the setpoints for Power, Throttle Pressure, and Steam Temperature all have step changes. In FIG. 11, curves 128, 129, 130 are SP, PV, OP of the MFA Power loop, and curves 131, 132, 133 are SP, PV, OP of the PID Power loop, respectively. Curves 134, 135, 136 are SP, PV, OP of the MFA Pressure loop, and curves 137, 138, 139 are SP, PV, OP of the PID Pressure loop, respectively. Curves 140, 141, 142 are SP, PV, OP of the MFA Temperature loop, and curves 143, 144, 145 are SP, PV, OP of the PID Temperature loop, respectively. In this case, the Power SP (Signals 128 and 131) is firstly stepped down from 58 to 34, the Pressure SP (Signals 134 and 137) is then stepped up from 40 to 62, and the Temperature SP (Signals 140 and 143) is lastly stepped up from 24 to 42. It can be seen that each setpoint change causes disturbances to all control loops. The 3×3 MFA control system is able to deal with the disturbances and keeps the Power, Pressure, and Temperature under control. In contrast, the PID control system cannot effectively control the 3×3 process resulting in oscillations in all 3 loops.

To summarize, the control trends demonstrate outstanding control performance of the 3×3 MFA control system for both tracking and regulating capabilities. The compensators inside the 3×3 MFA controller can effectively decouple and reduce the interactions from the other loops of the 3×3 PPT process. The control trends also demonstrate un-satisfactory control performance of the PID control system. Since PID controllers are single-loop controllers and can only treat the 3-Input-3-Output (3×3) multivariable process as three single-input-single-output (SISO) processes, it is very difficult for the PID control system to be effective and achieve good control performance. When there is a setpoint change or disturbance in the process, it will take a long time for the loops to settle down due to interactions among the loops. For instance, when the setpoint of Loop 1 is changed, the PID control action in Loop 1 will disturb Loop 2 and 3 causing their PID controllers to produce control actions, which will come back to disturb Loop 1. The multiple and bi-directional interactions can cause conflicting control actions and trigger a vicious cycle resulting in loop oscillations. Therefore, when applying PID for multivariable control, most PID controllers are significantly de-tuned to avoid potential oscillations or even unstable control. In the real world, a large percentage of multi-input-multi-output (MIMO) processes are treated as single-input-single-output (SISO) processes resulting in poor control performance, inconsistent quality, wasted materials and energy, and plant safety problems. The 3×3 MFA control system described in this patent can be very useful for controlling key process variables of boiler-turbine-generator (BTG) units in conventional and advanced power plants as well as other multivariable processes.

The invention claimed is:

1. A method of controlling a 3-Input-3-Output (3×3) process having three main-processes and six sub-processes, each of said main-processes having an input and an output responsive to the said input, each of said sub-processes having an input and an output, each of said main-processes having a measured process variable, which is the summation of the output of the main-process and outputs from two corresponding sub-processes; the 3-Input-3-Output (3×3) process having unknown relationships between their inputs and outputs, without approximating or modeling said relationship, comprising:
   a) selecting a setpoint representing a desired value for the measured process variable for each of the main-processes;
   b) obtaining an error value which is a function of the difference between said setpoint and said measured process variable for each of the main-processes;
   c) providing a hardware 3-Input-3-Output (3×3) controller that has three main controllers, each corresponding to one of the main-processes, and six compensators, each corresponding to one of the sub-processes;
   d) for each of the main processes, applying said error value as the sole input to its corresponding main controller whose inputs are time-delayed functions of said error value, and whose output is a control value combined with the outputs from two adjacent compensators to produce the total control output of the main controller;
   e) configuring each said main controller by entering a time constant based on the time constant of the corresponding main-process being controlled;
   f) for each of the sub-processes, providing a compensator which uses the control value from the corresponding main controller as its input, and uses the time constant of the main controller as its time constant;
   g) applying the total control output of each main controller to vary the input of its corresponding main-process and two sub-processes; and
   h) continuously iteratively varying the parameters of each of the main controllers to help minimize said error value for each of the main-processes.

2. The method of claim 1, further comprising adding said error value to the control value for each of the main-processes.

3. The method of claim 1, for each of the main-processes, further comprising adding the error value to said control value, in which the error value can be increased or decreased by a manually adjustable gain parameter.

4. The method of claim 1, wherein the 3-Input-3-Output (3×3) process is a Power-Pressure-Temperature (PPT) process of a Boiler-Turbine-Generator (BTG) unit of a conventional coal-fired power boiler, or a Once-Through Supercritical (OTSC) Boiler, or a Circulating Fluidized-Bed (CFB) Boiler, or a Once-Through Supercritical Circulating Fluidized-Bed (OTSC CFB) Boiler.

5. A 3-input-3-output (3×3) model-free adaptive (MFA) control system comprising:
   a) a 3-Input-3-Output (3×3) process to be controlled, further comprising:
      i) three main-processes $G_{11}$, $G_{22}$, $G_{33}$ having their corresponding process outputs $x_{11}(t)$, $x_{22}(t)$, $x_{33}(t)$, responsive to their corresponding control signals $u_1(t)$, $u_2(t)$, $u_3(t)$ respectively, and
      ii) six sub-processes $G_{21}$, $G_{31}$, $G_{12}$, $G_{32}$, $G_{13}$, $G_{23}$ having their corresponding process outputs $x_{21}(t)$, $x_{31}(t)$, $x_{12}(t)$, $x_{32}(t)$, $x_{13}(t)$, $x_{23}(t)$, wherein the process produces three measured process variables $y_1(t)$, $y_2(t)$, $y_3(t)$ for the corresponding main-processes, each of the process variables being affected by the output of its corresponding main-process, the outputs of two corresponding sub-processes signals as follows:
      $y_1(t)=x_{11}(t)+x_{12}(t)+x_{13}(t)+d_1(t)$,
      $y_2(t)=x_{21}(t)+x_{22}(t)+x_{23}(t)+d_2(t)$,
      $y_3(t)=x_{31}(t)+x_{32}(t)+x_{33}(t)+d_3(t)$;
   wherein $d_1(t)$, $d_2(t)$ and $d_3(t)$ are disturbance signals; and
   b) a hardware 3-Input-3-Output (3×3) model-free adaptive (MFA) controller further comprising:
      i) three main-controllers $C_{11}$, $C_{22}$, $C_{33}$ responsive to error signals $e_1(t)$, $e_2(t)$ and $e_3(t)$ respectively and having their corresponding control outputs $v_{11}(t)$, $v_{22}(t)$ $v_{33}(t)$; and
      ii) six compensators $C_{21}$, $C_{31}$, $C_{12}$, $C_{32}$, $C_{13}$, $C_{23}$ having their corresponding outputs $v_{21}(t)$, $v_{31}(t)$, $v_{12}(t)$, $v_{32}(t)$, $v_{13}(t)$, $v_{23}(t)$ wherein:
      iii) the error signals $e_1(t)$, $e_2(t)$, $e_3(t)$ are iteratively calculated as follows:
      $e_1(t)=r_1(t)-y_1(t)$, if $G_{11}$ is direct acting
      $e_1(t)=-[r_1(t)-y_1(t)]$, if $G_{11}$ is reverse acting
      $e_2(t)=r_2(t)-y_2(t)$, if $G_{22}$ is direct acting
      $e_2(t)=-[r_2(t)]-y_2(t)]$, if $G_{22}$ is reverse acting
      $e_3(t)=r_3(t)-y_3(t)$, if $G_{33}$ is direct acting
      $e_3(t)=-[r_3(t)]-y_3(t)]$, if $G_{33}$ is reverse acting where a process is direct acting if the process output increases as the process input increases, and a process is reverse acting, where a process is direct acting if the process output increases as the process input increases, and a process is reverse acting if the process output decreases as the process input increases, and $r_1(t)$, $r_2(t)$ and $r_3(t)$ are set points;

iv) each of the compensators uses a control output from a corresponding main-controller as its input, and uses the time constant of the corresponding main-controller as its time constant; and v) each of the main-controllers has a combined control output being iteratively calculated based on its corresponding control output and the outputs from two corresponding compensators as follows:
$u_1(t) = v_{11}(t) + v_{12}(t) + v_{13}(t)$,
$u_2(t) = v_{21}(t) + v_{22}(t) + v_{23}(t)$,
$u_3(t) = v_{31}(t) + v_{32}(t) + v_{33}(t)$, wherein, the combined control output of each main-controller is the input to its corresponding main-process and two sub-processes in order to control the measured process variable of its corresponding main-process.

6. w) The control system of claim 5, wherein:

a) the three main-controllers $C_{11}$, $C_{22}$, and $C_{33}$, each have a corresponding normalized error value $E_1^{11}(n)$, $E_1^{22}(n)$, and $E_1^{33}(n)$ being computed with a normalization function N(.) as follows:

$$E_1^{11}(n) = \frac{K_c^{11}}{T_c^{11}} N(e_1(t)),$$

$$E_1^{22}(n) = \frac{K_c^{22}}{T_c^{22}} N(e_2(t)),$$

$$E_1^{33}(n) = \frac{K_c^{33}}{T_c^{33}} N(e_3(t)),$$

in which, n denotes the nth iteration; $e_1(t)$, $e_2(t)$, and $e_3(t)$ are the error signals as the controller inputs, $K_c^{11} > 0$, $K_c^{22} > 0$, and $K_c^{33} > 0$ are the controller gains, and $T_c^{11} > 0$, $T_c^{22} > 0$, and $T_c^{33} > 0$ are the time constants for $C_{11}$, $C_{22}$, and $C_{33}$, respectively;

b) the main-controller $C_{11}$, $C_{22}$, and $C_{33}$ each includes a neural network with an input layer including a plurality of input neurons arranged to receive normalized, scaled and delayed forms of said error signal, a hidden layer including a plurality of hidden neurons each arranged to sum the signals received by each of said input neurons weighted by an individual first weighting factor, and an output neuron which sums the individually weighted outputs of hidden neurons, the weighting factors for said hidden neuron outputs being iteratively adjusted, and an activation function f(x) substantially of the form $$f(x) = 0, \text{ if } x < -\frac{b}{a}$$

$$f(x) = ax + b, \text{ if } -\frac{b}{a} \leq x \leq \frac{b}{a}$$

$$f(x) = 1, \text{ if } x > \frac{b}{a}$$

where a is an arbitrary constant and b=½;

c) the main-controllers are arranged to produce their control outputs $v_{11}(t)$, $v_{22}(t)$, $v_{33}(t)$ substantially based on the following difference equations and online learning algorithms of the neural network:

For Controller $C_{11}$:

$$p_j^{11}(n) = \sum_{i=1}^{N} w_{ij}^{11}(n) E_i^{11}(n),$$

$$q_j^{11}(n) = a p_j^{11}(n) + b,$$

$$v_{11}(n) = K_c^{11} e_1(n) + 100 \left[ a \sum_{j=1}^{N} h_j^{11}(n) q_j^{11}(n) + b \right],$$

$$\Delta w_{ij}^{11}(n) = a^2 \eta^{11} e_1(n) E_i^{11}(n) h_j^{11}(n),$$

$$\Delta h_j^{11}(n) = a \eta^{11} e_1(n) q_j^{11}(n);$$

For Controller $C_{22}$ $$p_j^{22}(n) = \sum_{i=1}^{N} w_{ij}^{22}(n) E_i^{22}(n),$$

$$q_j^{22}(n) = a p_j^{22}(n) + b,$$

$$v_{22}(n) = K_c^{22} e_2(n) + 100 \left[ a \sum_{j=1}^{N} h_j^{22}(n) q_j^{22}(n) + b \right],$$

$$\Delta w_{ij}^{22}(n) = a^2 \eta^{22} e_2(n) E_i^{22}(n) h_j^{22}(n),$$

$$\Delta h_j^{22}(n) = a \eta^{22} e_2(n) q_j^{22}(n);$$

For Controller $C_{33}$ $$p_j^{33}(n) = \sum_{i=1}^{N} w_{ij}^{33}(n) E_i^{33}(n),$$

$$q_j^{33}(n) = a p_j^{33}(n) + b,$$

$$v_{33}(n) = K_c^{33} e_2(n) + 100 \left[ a \sum_{j=1}^{N} h_j^{33}(n) q_j^{33}(n) + b \right],$$

$$\Delta w_{ij}^{33}(n) = a^2 \eta^{33} e_2(n) E_i^{33}(n) h_j^{33}(n),$$

$$\Delta h_j^{33}(n) = a \eta^{33} e_2(n) q_j^{33}(n);$$

in which, n denotes the nth iteration; a is an arbitrary constant and b=½ which are bounded by the activation function f(x); $\eta^{11} > 0$, $\eta^{22} > 0$, and $\eta^{33} > 0$ are the learning rates for $C_{11}$, $C_{22}$, and $C_{33}$, respectively; $p_j^{11}$, $p_j^{22}$, $p_j^{33}$, $q_j^{11}$, $q_j^{22}$, and $q_j^{33}$ are variables of the neural network for $C_{11}$, $C_{22}$, and $C_{33}$, respectively; $w_{ij}^{11}$, $w_{ij}^{22}$, $w_{ij}^{33}$, $h_j^{11}$, $h_j^{22}$, and $h_j^{33}$ are weighting factors of the neural network for $C_{11}$, $C_{22}$, and $C_{33}$, respectively; $K_c^{11} > 0$, $K_c^{22} > 0$, and $K_c^{33} > 0$ are the controller gains for $C_{11}$, $C_{22}$, and $C_{33}$, respectively; and $E_i^{11}(n)$, $E_i^{22}(n)$, $E_i^{33}(n)$ are the delayed signals of $E_1^{11}(n)$, $E_1^{22}(n)$, and $E_1^{33}(n)$, respectively; and d) the compensators have their corresponding outputs $C_{21}(S)$, $C_{31}(S)$, $C_{12}(S)$, $C_{32}(S)$, $C_{13}(S)$, $C_{23}(S)$ substantially in the form of the following Laplace transfer functions:

$$C_{21}(S) = \frac{V_{21}(S)}{V_{11}(S)} = \frac{K_s^{21} K_c^{21}}{T_c^{21} S + 1}.$$

$$C_{31}(S) = \frac{V_{31}(S)}{V_{11}(S)} = \frac{K_s^{31} K_c^{31}}{T_c^{31} S + 1}.$$

$$C_{12}(S) = \frac{V_{12}(S)}{V_{22}(S)} = \frac{K_s^{12} K_c^{12}}{T_c^{12} S + 1}.$$

$$C_{32}(S) = \frac{V_{32}(S)}{V_{22}(S)} = \frac{K_s^{32} K_c^{32}}{T_c^{32} S + 1}.$$

$$C_{13}(S) = \frac{V_{13}(S)}{V_{33}(S)} = \frac{K_s^{13} K_c^{13}}{T_c^{13} S + 1}.$$

$$C_{23}(S) = \frac{V_{23}(S)}{V_{33}(S)} = \frac{K_s^{23} K_c^{23}}{T_c^{23} S + 1}.$$

in which, S is the Laplace transform operator; $V_{11}(S)$, $V_{22}(S)$, $V_{33}(S)$, $V_{21}(S)$, $V_{31}(S)$, $V_{12}(S)$, $V_{32}(S)$, $V_{13}(S)$, and $V_{23}(S)$ are the Laplace transform of signals $v_{11}(t)$, $v_{22}(t)$, $v_{33}(t)$, $v_{21}(t)$, $v_{31}(t)$, $v_{12}(t)$, $v_{32}(t)$, $v_{13}(t)$, and $v_{23}(t)$, respectively; $K_c^{21} > 0$, $K_c^{31} > 0$, $K_c^{12} > 0$, $K_c^{32} > 0$, $K_c^{13} > 0$, and $K_c^{23} > 0$ are the compensator gains; $K_s^{21}$, $K_s^{31}$, $K_s^{12}$, $K_s^{32}$, $K_s^{13}$, $K_s^{23}$ are the compensator sign factors, and $T_c^{11} > 0$, $T_c^{22} > 0$, and $T_c^{33} > 0$ are the time constants for the main controllers $C_{11}$, $C_{22}$, and $C_{33}$, respectively.

7. The control system of claim 6, in which the compensators have said compensator sign factors being selected based on the acting types of the main-processes $G_{ll}$ and sub-processes $G_{lm}$ as follows:

$K_s^{lm} = 1$, if $G_{ll}$ and $G_{lm}$ have different acting types
$K_s^{lm} = -1$, if $G_{ll}$ and $G_{lm}$ have the same acting type
where l=1, 2, 3; m=1, 2, 3; and l≠m.

8. The control system of claim 5, in which the 3-Input-3-Output (3×3) process is a Power-Pressure-Temperature (PPT) process of a Boiler-Turbine-Generator (BTG) unit of an electrical power or energy generation plant, in which the 3×3 process has the following main-processes and sub-processes:
for $G_{11}$, the input is Firing Rate and output is Power,
for $G_{22}$, the input is Throttle Valve Position and output is Steam Throttle Pressure,
for $G_{33}$, the input is Water Feed and output is Master Steam Temperature,
for $G_{21}$, the input is Firing Rate and output is Steam Throttle Pressure,
for $G_{31}$, the input is Firing Rate and output is Master Steam Temperature,
for $G_{12}$, the input is Throttle Valve Position and output is Power,
for $G_{32}$, the input is Throttle Valve Position and output is Master Steam Temperature,
for $G_{13}$, the input is Water Feed and output is Power,
for $G_{23}$, the input is Water Feed and output is Steam Throttle Pressure.

9. The control system of claim 8, in which the 3-Input-3-Output (3×3) process is a Power-Pressure-Temperature (PPT) process of a Boiler-Turbine-Generator (BTG) unit of a conventional coal-fired power boiler, or a Once-Through Supercritical (OTSC) Boiler, or a Circulating Fluidized-Bed (CFB) Boiler, or a Once-Through Supercritical Circulating Fluidized-Bed (OTSC CFB) Boiler.

* * * * *